(12) United States Patent
Zeng et al.

(10) Patent No.: US 11,057,939 B2
(45) Date of Patent: Jul. 6, 2021

(54) APPARATUS, SYSTEM, AND METHOD FOR PREAMBLES FOR UNLICENSED ACCESS

(71) Applicant: Apple Inc., Cupertino, CA (US)

(72) Inventors: Wei Zeng, San Diego, CA (US); Wei Zhang, Santa Clara, CA (US); Tianyan Pu, Cupertino, CA (US); Haitong Sun, Irvine, CA (US); Yuchul Kim, Santa Clara, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 126 days.

(21) Appl. No.: 16/372,316

(22) Filed: Apr. 1, 2019

(65) Prior Publication Data

US 2019/0313458 A1   Oct. 10, 2019

Related U.S. Application Data

(60) Provisional application No. 62/653,582, filed on Apr. 6, 2018.

(51) Int. Cl.
*H04W 74/08* (2009.01)
*H04J 13/00* (2011.01)
*H04W 16/14* (2009.01)
*H04W 74/00* (2009.01)

(52) U.S. Cl.
CPC ..... *H04W 74/0833* (2013.01); *H04J 13/0044* (2013.01); *H04W 16/14* (2013.01); *H04W 74/006* (2013.01)

(58) Field of Classification Search
CPC ............. H04W 74/0833; H04W 16/14; H04W 74/006; H04W 76/10; H04W 72/0446; H04J 13/0044
See application file for complete search history.

(56) References Cited

U.S. PATENT DOCUMENTS

2018/0049190 A1* 2/2018 Abedini ................ H04W 76/12
2018/0255586 A1* 9/2018 Einhaus ............ H04W 72/0413

FOREIGN PATENT DOCUMENTS

| CN | 1981482 A | 6/2007 |
|---|---|---|
| EP | 3 410 811 A1 | 12/2018 |
| JP | 2015149723 A | 8/2015 |
| JP | A-2016528839 | 9/2016 |
| KR | 10-2010-008048 | 7/2010 |

(Continued)

OTHER PUBLICATIONS

LG Electronics, R1-1802239, Potential solutions for NR unlicensed operation, 3GPP TSG RAN WG1 #92 (3GPP server release date: Feb. 16, 2018), 3GPP TSG RAN WG1 Meeting 92, Athens, Greece, Feb. 26-Mar. 2, 2018 pages.

(Continued)

*Primary Examiner* — Will W Lin
(74) *Attorney, Agent, or Firm* — Kowert, Hood, Munyon, Rankin & Goetzel, P.C.

(57) ABSTRACT

Apparatuses, systems, and methods for transmitting a preamble. The UE may transmit a preamble to a base station in a random access channel (RACH). The RACH may be located in unlicensed spectrum. The bandwidth of the preamble may cover a majority of a nominal channel bandwidth of the RACH. The UE may receive a random access response and establish a connection with the base station in response to receiving the random access response.

20 Claims, 12 Drawing Sheets

(56) References Cited

FOREIGN PATENT DOCUMENTS

| KR | 20100080486 A | 7/2010 |
| KR | 101547284 | 8/2015 |
| WO | WO 2017/031725 A1 | 3/2017 |
| WO | WO 2017/171847 A1 | 10/2017 |
| WO | WO 2017/195847 A1 | 11/2017 |
| WO | WO 2018/232123 A1 | 12/2018 |

OTHER PUBLICATIONS

InterDigital Inc, R1-1802645, Proposals for NR Operation in Unlicensed Spectrum, 3GPP TSG RAN WG1 #92 (3GPP server release date: Feb. 17, 2018), 3GPP TSG RAN WG1 Meeting 92, Athens, Greece, Feb. 26-Mar. 2, 2018, 8 pages.

Huawei et al., R1-1801368, NR licensed assisted and standalone operation on unlicensed bands, 3GPP TSG RAN WG1 #92 (3GPP server release date: Feb. 17, 2018), 3GPP TSG RAN WG1 Meeting 92, Athens, Greece, Feb. 26-Mar. 2, 2018, 4 pages.

Notice of Preliminary Rejection from Patent Application No. 10-2019-0040198, dated Mar. 12, 2020, Apple Inc., includes English Translation, 15 pages.

Ericsson; "Uplink Resource Allocation Design for Enhanced LAA"; R1-165141; 3GPP TSG-RAN WG1#85; Nanjing, China; May 23-27, 2016; five pages.

NTT DOCOMO, Inc.; "Discussion on PRACH for eLAA UL"; R1-165189, 3GPP TSG RAN WG1 Meeting #85; Nanjing, P. R. China, May 23-27, 2016; six pages.

Nokia, Alcatel-Lucent Shanghai Bell; "Discussion on PRACH design for eLAA UL"; R1-162919, 3GPP TSG-RAN WG1 Meeting #84bis; Busan, South Korea, Apr. 11-15, 2016; six pages.

Extended European Search Report, European Patent Application 19167198.1, dated Aug. 19, 2019, ten pages.

LG Electronics; "Potential solutions for NR unlicensed operation"; 3GPP TSG RAN WG1 Meeting #92 Ra-1802239; Athens, Greece; Feb. 26-Mar. 2, 2018; 8 pages.

Interdigital Inc.; "Proposals for NR Operation in Unlicensed Spectrum"; 3GPP TSG RAN WG1 Meeting 92 R1-1802645; Athens, Greece; Feb. 26-Mar. 2, 2018; 8 Pages.

Huawei, Hisilicon; "NR licensed assisted and standalone operation on unlicensed bands"; 3GPP TSG RAN WG1 Meeting #92 R1-1801368; Athens, Greece; Feb. 26-Mar. 2, 2018; 4 pages.

Examination Report for IN application No. 201914013731, dated Jan. 28, 2021, 6 pages.

* cited by examiner

| | Preamble Formats | L-RA | SCS [kHz] | T-cp [Ts] | T-cp [ms] | T-seq [Ts] | T-seq [ms] | T-total [ms] | T-Guard [ms] | Cell Radius [km] |
|---|---|---|---|---|---|---|---|---|---|---|
| Long Sequence | 0 | 839 | 1.25 | 3168 | 0.103 | 24576 | 0.8 | 0.903 | 0.097 | 15 |
| | 1 | 839 | 1.25 | 21024 | 0.684 | 2 x 24576 | 1.6 | 2.284 | 0.716 | 107 |
| | 2 | 839 | 1.25 | 4688 | 0.153 | 4 x 24576 | 3.2 | 3.353 | 0.647 | 97 |
| | 3 | 839 | 5 | 3168 | 0.103 | 4 x 6144 | 0.8 | 0.903 | 0.097 | 15 |
| Short Sequence | A1 | 139 | 15 x 2^u | 288 x 2^-u | | 2 x 2048 x 2^-u | | | | |
| | A2 | 139 | 15 x 2^u | 576 x 2^-u | | 4 x 2048 x 2^-u | | | | |
| | A3 | 139 | 15 x 2^u | 864 x 2^-u | | 6 x 2048 x 2^-u | | | | |
| | B1 | 139 | 15 x 2^u | 216 x 2^-u | | 2 x 2048 x 2^-u | | | | |
| | B2 | 139 | 15 x 2^u | 360 x 2^-u | | 4 x 2048 x 2^-u | | | | |
| | B3 | 139 | 15 x 2^u | 504 x 2^-u | | 6 x 2048 x 2^-u | | | | |
| | B4 | 139 | 15 x 2^u | 936 x 2^-u | | 12 x 2048 x 2^-u | | | | |
| | C1 | 139 | 15 x 2^u | 1240 x 2^-u | | 2048 x 2^-u | | | | |
| | C2 | 139 | 15 x 2^u | 2048 x 2^-u | | 4 x 2048 x 2^-u | | | | |

FIG. 7

APPARATUS, SYSTEM, AND METHOD FOR PREAMBLES FOR UNLICENSED ACCESS

PRIORITY

This application claims benefit of priority of U.S. provisional application Ser. No. 62/653,582 titled "Apparatus, System, and Method for Preambles for Unlicensed Access" filed Apr. 6, 2018, which is hereby incorporated by reference in its entirety as though fully and completely set forth herein.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. In recent years, wireless communication has expanded from using licensed spectrum to including use of unlicensed spectrum. However, different techniques may be required for different spectrum areas. Thus, improvements in the field are desired.

SUMMARY

Embodiments relate to apparatuses, systems, and methods for using preambles for wireless communication.

A UE may transmit a preamble to a base station in a random access channel (RACH). The RACH may be located in unlicensed spectrum. The bandwidth of the preamble may cover a majority of a nominal channel bandwidth of the RACH. The UE may receive a random access response and establish a connection with the base station in response to receiving the random access response.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 7 illustrates an exemplary table of preamble formats, according to some embodiments;

Figure 1:
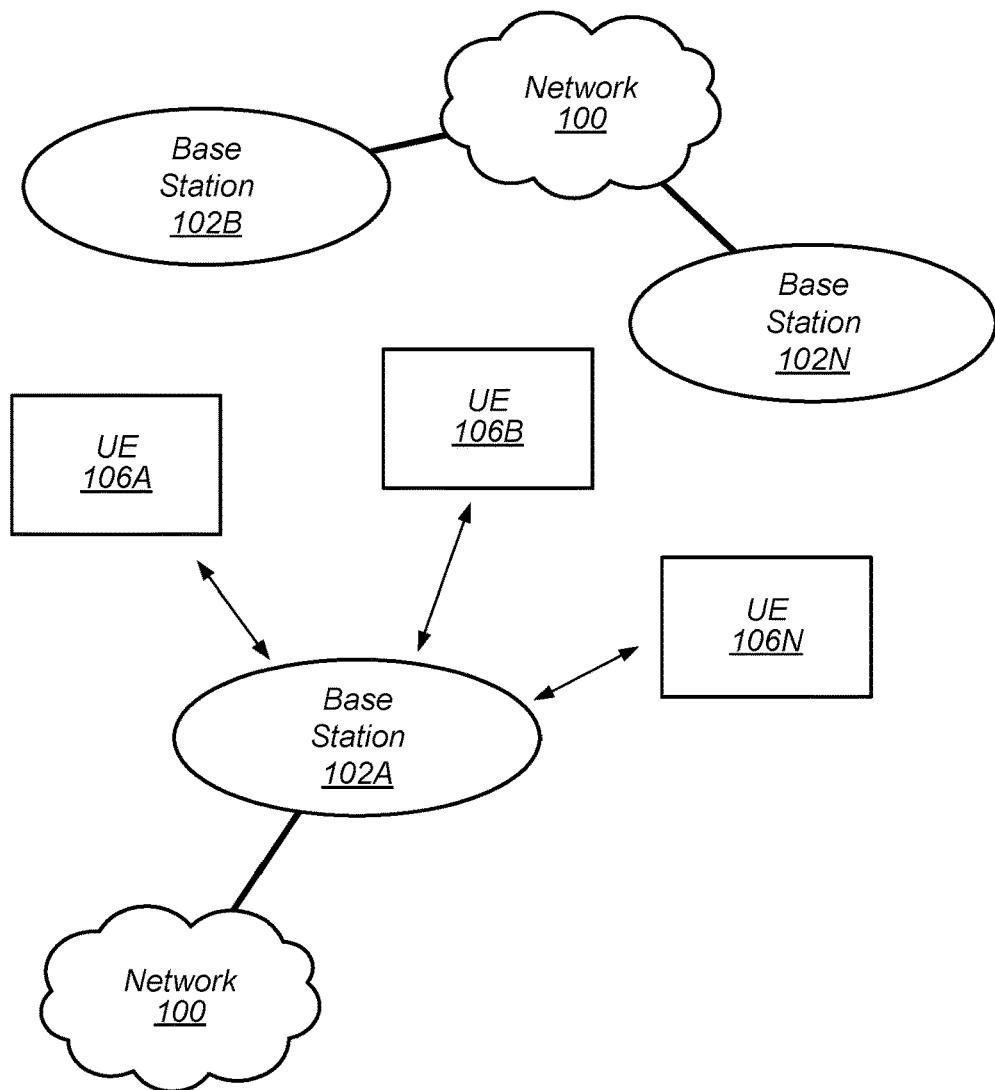
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
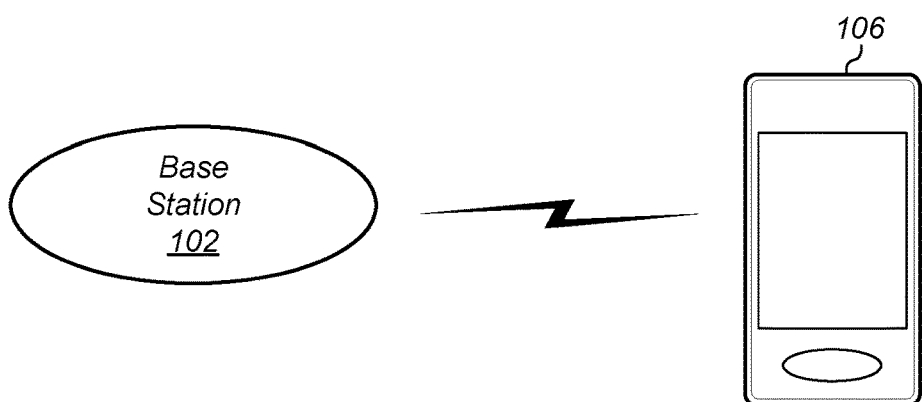
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'ceNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
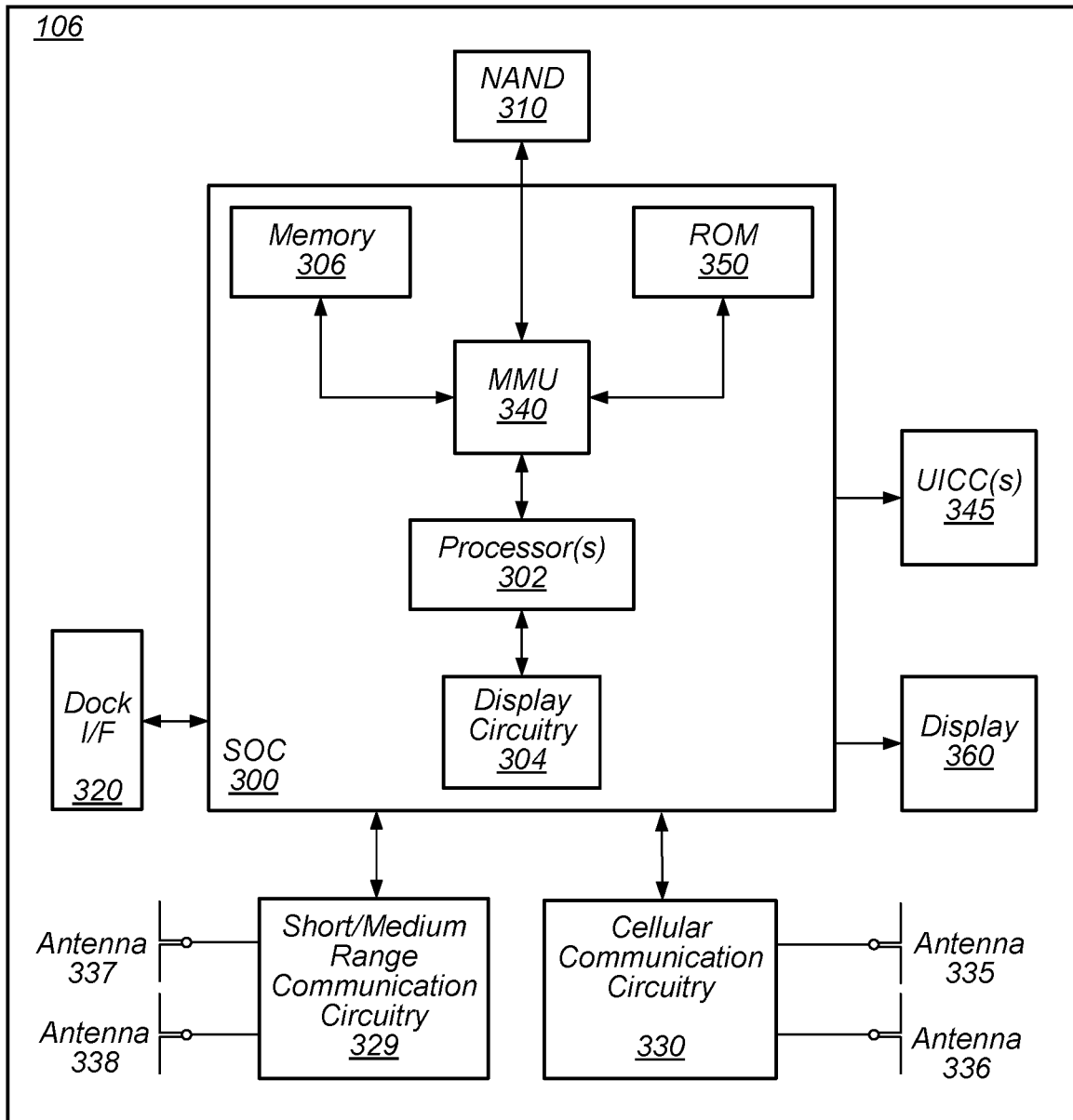
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing the above features for time division multiplexing UL data for NSA NR operations. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
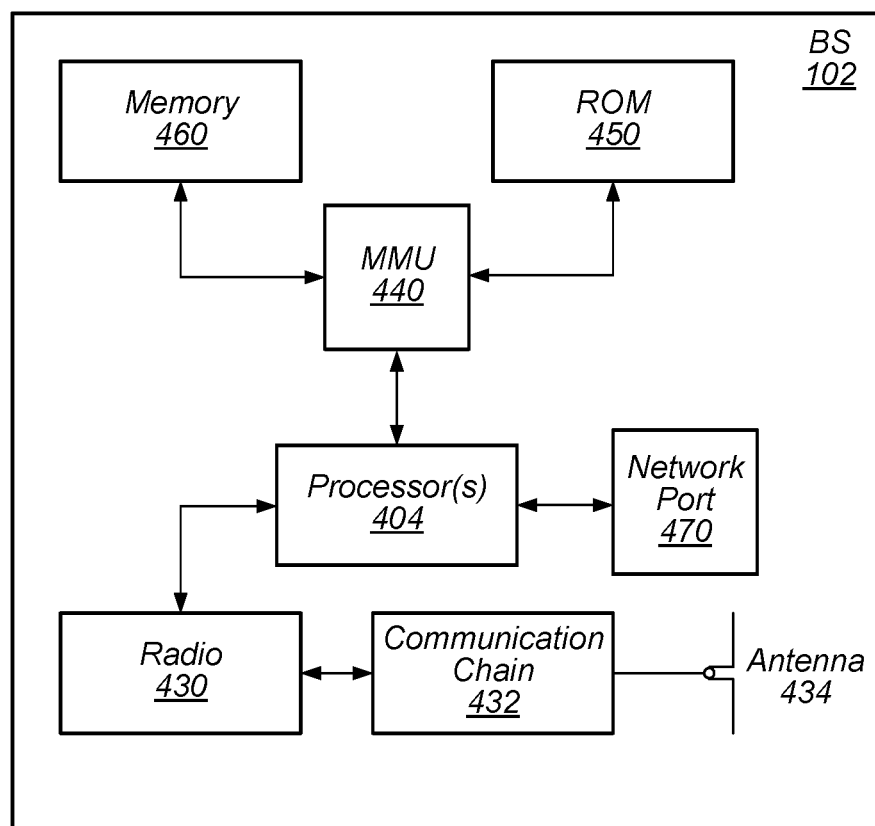
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
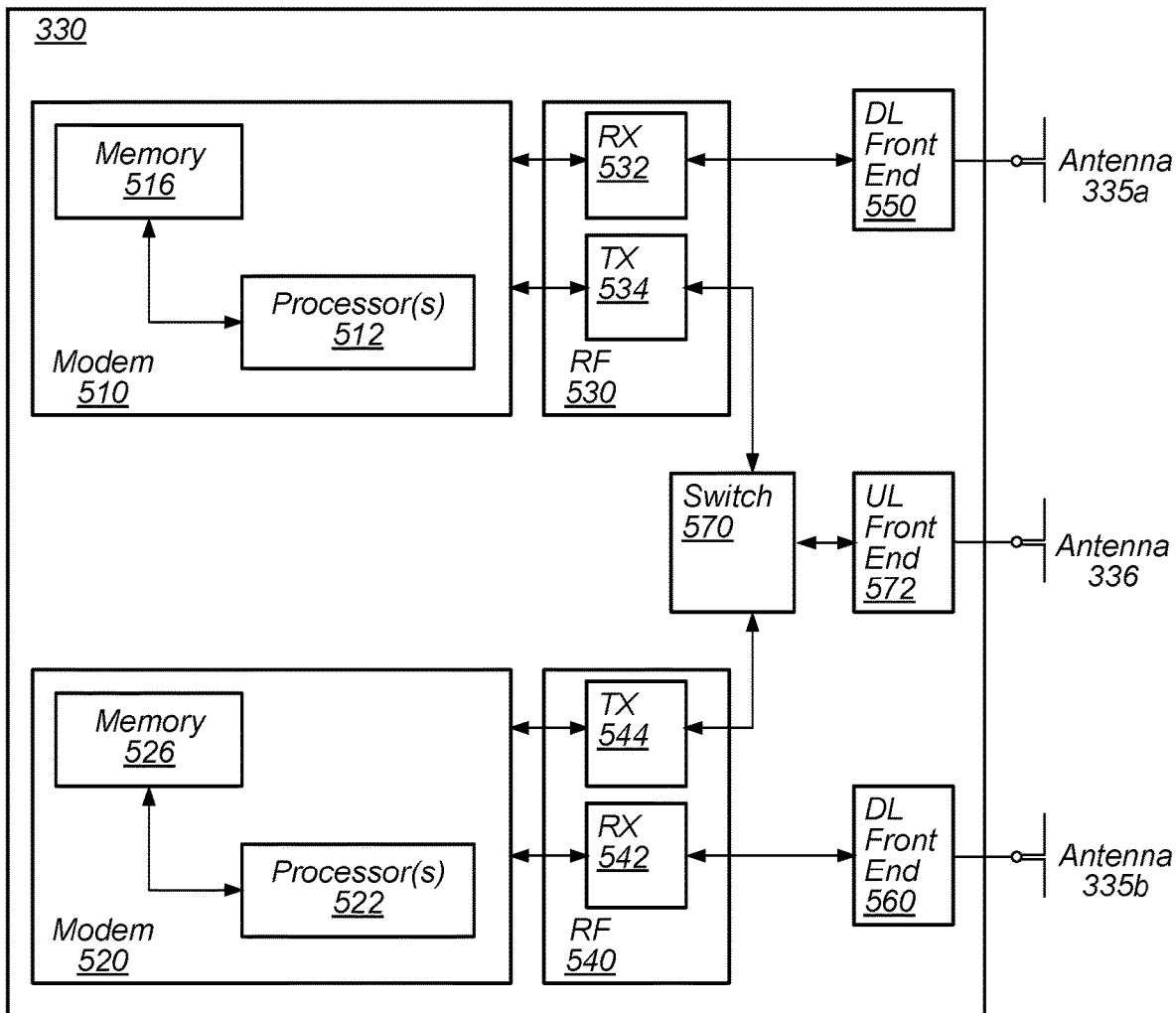
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to establish a first wireless link with a first cell according to a first radio access technology (RAT), wherein the first cell operates in a first system bandwidth and establish a second wireless link with a second cell according to a second radio access technology (RAT), wherein the second cell operates in a second system bandwidth. Further, the cellular communication circuitry 330 may be configured to determine whether the cellular communication circuitry 330 has uplink activity scheduled according to both the first RAT and the second RAT and perform uplink activity for both the first RAT and the second RAT by time division multiplexing (TDM) uplink data for the first RAT and uplink data for the second RAT if uplink activity is scheduled according to both the first RAT and the second RAT. In some embodiments, to perform uplink activity for both the first RAT and the second RAT by time division multiplexing (TDM) uplink data for the first RAT and uplink data for the second RAT if uplink activity is scheduled according to both the first RAT and the second RAT, the cellular communication circuitry 330 may be configured to receive an allocation of a first UL subframe for transmissions according to the first RAT and an allocation of a second UL subframe for transmissions according to the second RAT. In some embodiments, the TDM of the uplink data may be performed at a physical layer of the cellular communication circuitry 330. In some embodiments, the cellular communication circuitry 330 may be further configured to receive an allocation of a portion of each UL subframe for control signaling according to one of the first or second RATs.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for time division multiplexing UL data for NSA NR operations, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Non-Standalone (NSA) Operation with LTE

Figure 6A:
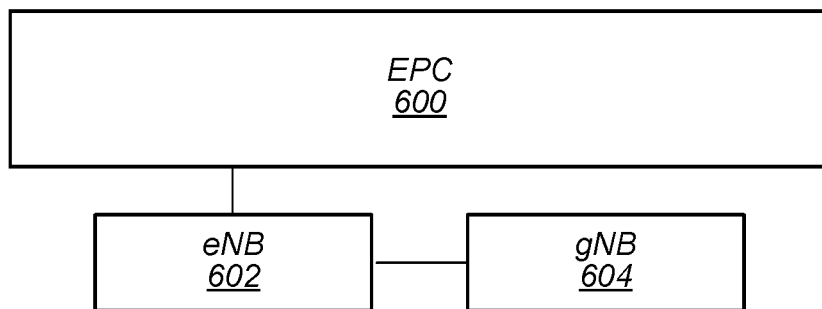
FIG. 6A illustrates an example of connections between an EPC network, an LTE base station (eNB), and a 5G NR base station (gNB), according to some embodiments.
Figure 6B:
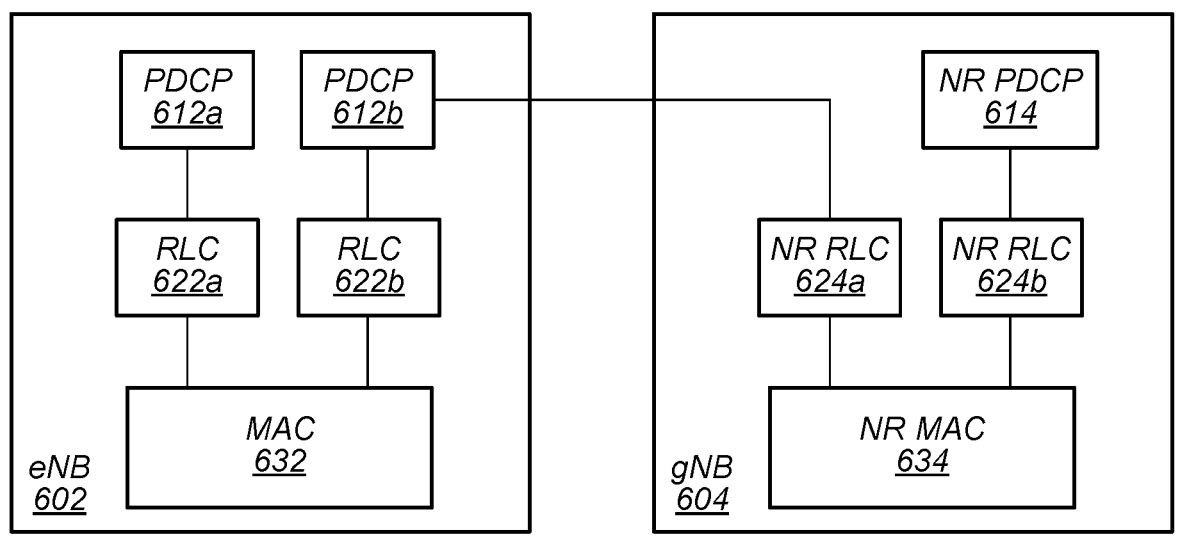
FIG. 6B illustrates an example of a protocol stack for an eNB and a gNB, according to some embodiments.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 622*b* of eNB 602 via an $X_2$ interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a $4^{th}$ order harmonic of LTE UL band 20 and NR UL transmission may create a $5^{th}$ order intermodulation product that may interfere with LTE DL band 7 reception and thus desensitize a receiving for LTE DL band 7.

In addition, future specifications NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

Embodiments described herein define systems, methods, and mechanisms for a UE to support 5G NSA.

NR Preamble

The physical random access channel (PRACH) may be used to carry random access preambles, which may be used for initiation of a random access procedure. In the frequency domain, several subcarriers at both ends of the, e.g., 6, physical resource blocks (PRBs) may not be used to avoid interference with adjacent channels (e.g., PUCCH and/or PUSCH). In the time domain, the cyclic prefix (CP) and guard time (GT) may be used to avoid interference with the previous and next subframes. In some embodiments, the GT may be related to the maximum cell radius. A random access preamble may include a sequence, a CP, and a GT. The sequence, CP, and GT may be defined in Ts (e.g., the basic time unit of the standard, which may be specified as a set number of nanoseconds, such as 32.552 ns) and/or in ms.

NR supports scaled PRACH (physical random access channel) numerology. FIG. 7 is a table illustrating exemplary preamble formats, e.g., which may be used for the licensed spectrum in NR. As shown preamble formats 0-3 may be long sequence and formats A1-C2 may be short sequences. The table shows sequence length (L_RA), subcarrier spacing (SCS) in kHz, CP length in Ts (cellular sample length) and in ms, sequence length in Ts and in ms, total length in ms, GT in ms, and cell radius in km (although other units are envisioned wherever desired). The long sequence format may be used for macro cells and the short sequence may be used for smaller cells. Note that the value of u may be specified by the network and may have values of 0, 1, 2, or 3.

In some embodiments, there may be requirements associated with the occupied channel bandwidth (OCB), e.g., which may apply to unlicensed spectrum in NRU (New Radio Unlicensed). For example, the bandwidth containing 99% of the power of the signal may be required to occupy between 80% and 100% of the nominal channel bandwidth (NCB). The OCB in 60 GHz bands may be more than 70% of the NCB. In effect, this may mean that the entire channel should be used by a UE instead of a fraction of the channel.

The following lists equivalent isotropically radiated power (EIRP) and power spectrum density (PSD). For 5 GHz, the EIRP should be 23 dBm and the PSD 10 dBm/MHz for the range 5150-5350 MHz. For 60 GHz, the EIRP should be 40 dBm and the PSD should be 13 dBm/MHz. There may be limitations on the maximal transmission power or coverage due to the EIRP limit.

In some implementations, RACH design for the licensed spectrum shown in FIG. 7 may not match well for the unlicensed spectrum according to regulatory requirements. For example, for long sequences, bandwidth is less than or equal to 839 tones*5 kHz=4.195 MHz. Using this size, the UE would not be able to occupy 80%-100% of the NCB and would in fact only occupy 25% of the NCB. Additionally, using this bandwidth, due to PSD requirements, Pmax is approximately equal to 16 dBm (5 Ghz), which falls short of the power requirements discussed above.

As another example, for short sequences, bandwidth is less than or equal to 139 tones*30 kHz=4.17 MHz, which relates to Pmax of approximately 16 dBm. For sequences having bandwidth of less than or equal to 139 tones*60 kHz=8.34 mHz, which results in a Pmax of approximately 19 dBm. Both of these values are much lower than the 20 MHz channel size, failing the occupation requirement of the NCB discussed previously. In addition, although increasing SCS can increase the peak power, it may also reduce the symbol/RACH duration, which may reduce the overall time of the signal transmission.

Thus, the existing NR RACH format (e.g., shown in FIG. 7) may limit the peak power/coverage of RACH preamble for NR-U. Additionally, the NR RACH format may not occupy a wide enough bandwidth that may be set by regulation.

Spread in the Frequency Domain

In some embodiments, these limitations may be overcome by spreading in the frequency domain, e.g., with sub-carrier interlacing. For example, in a first embodiment, the same sub-carrier spacing may be used (e.g., SCS=15 kHz). The frequency may be mapped to a tone grid of every M subcarriers of the full set of subcarriers of the RACH. In some embodiments, M may be selected (or configured, e.g., by the network) such that the signal occupies the whole channel or as wide enough to achieve a high or maximum allowed transmit power (e.g., 23 dBm).

Such embodiments may allow a larger peak transmit power. For example, these embodiments may effectively increase the bandwidth by M times, which equivalently allows the peak transmit power to increase by M times. The value of M may be any integer selected by the UE or the network or in any desirable manner. Such embodiments may allow the use of the same numerology and same PRACH preamble duration in the unlicensed band as in the licensed band. Additionally, the single carrier waveform property may be maintained, which may be similar or equivalent to repeating the same single carrier waveform in the time domain. Further, these embodiments may allow for a unified detection at the receiver.

Figure 8:
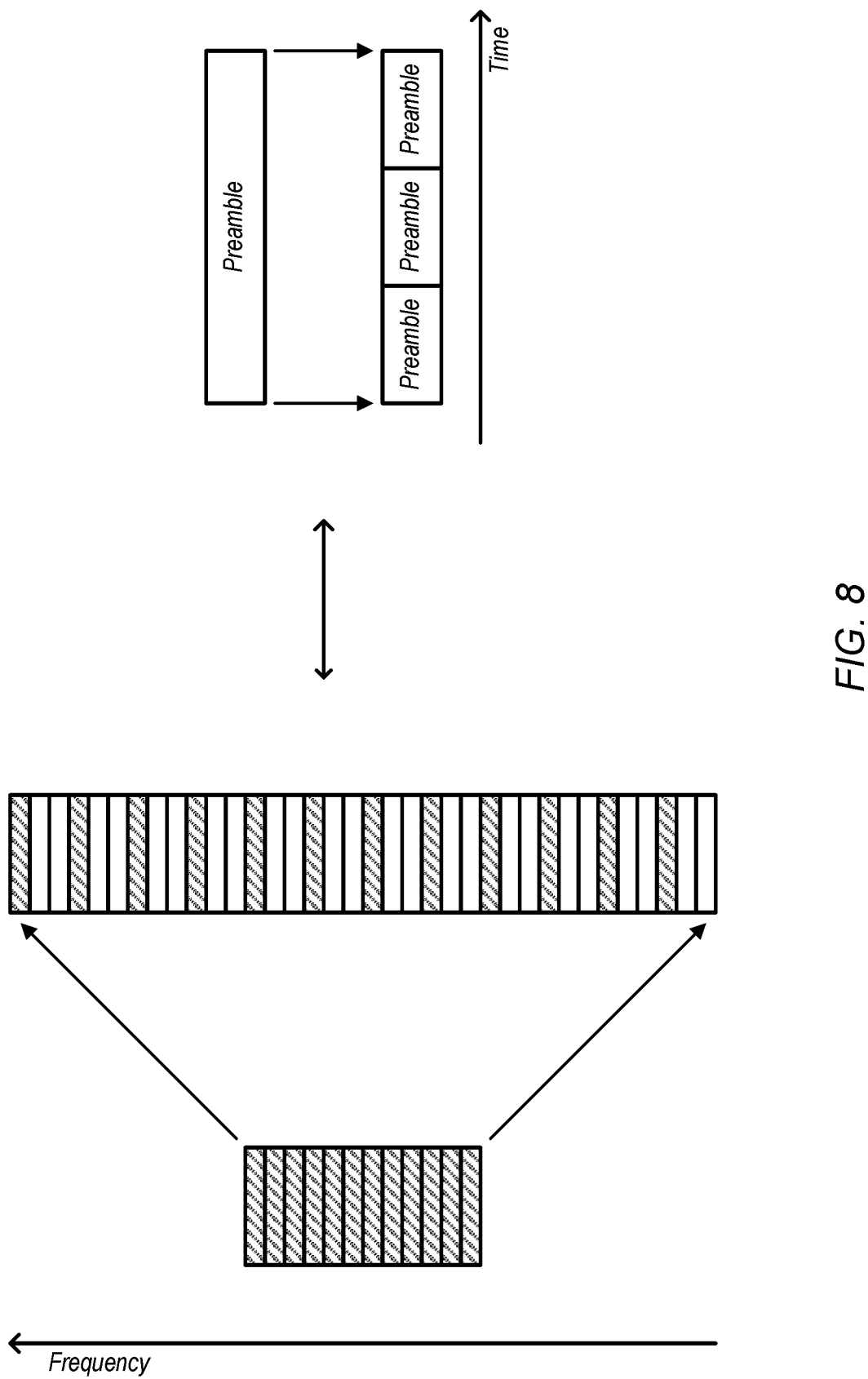
FIGS. 8-10 are exemplary illustrations of spreading preambles in the frequency domain using sub-carrier interlacing, according to some embodiments.

FIG. 8 illustrates an exemplary embodiment before and after the modification (e.g. moving from contiguous to spacing of every M subcarriers). As a result, the preamble may be effectively repeated in the time domain three times according to this embodiment instead of a single time according to prior methods.

Figure 9:
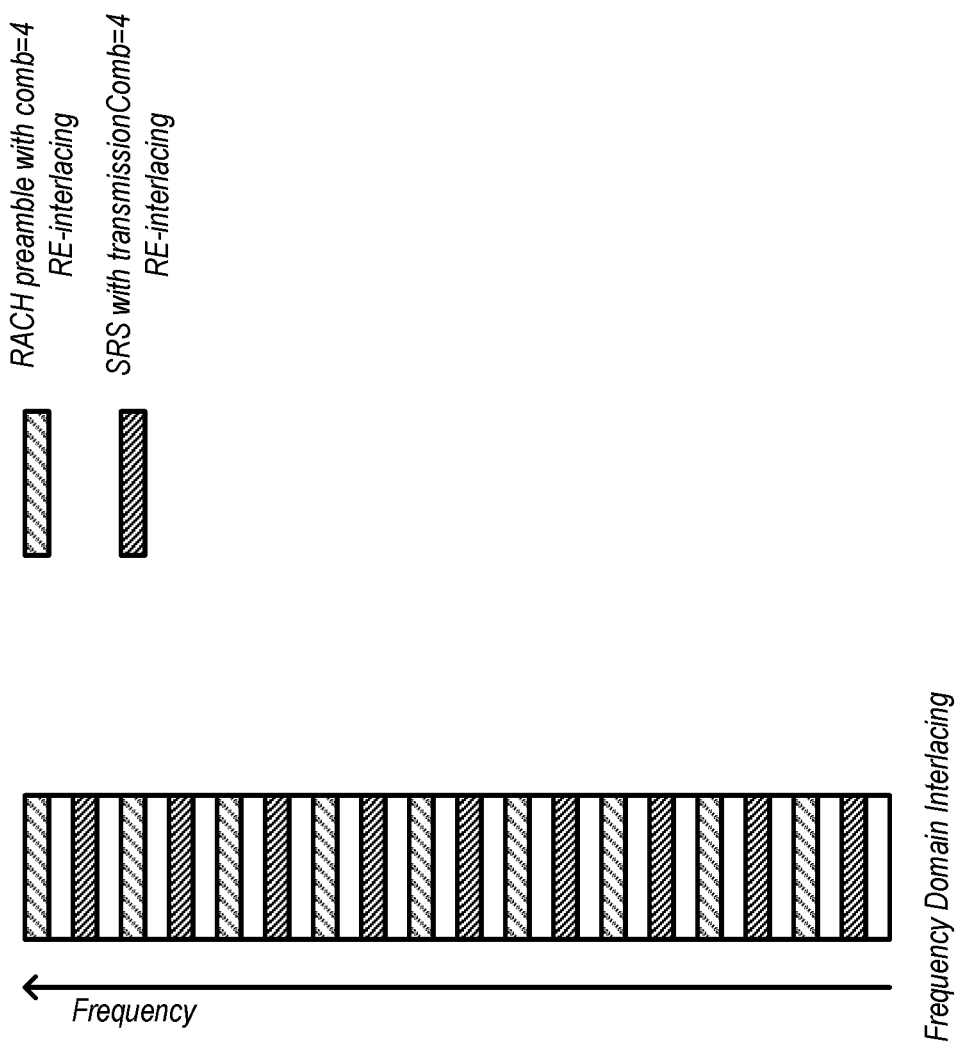

FIG. 9 illustrates exemplary channel multiplexing between RACH preambles and the sounding reference signals (SRSs). Similar to the "comb-based" tone-interlacing (or resource element (RE)-interlacing) waveform of FIG. 8, the RACH preambles and SRS may be FDM (frequency-domain multiplexed) together within the same allocation of time-frequency resources. Other spacings than those shown in FIG. 9 are envisioned.

Figure 10:
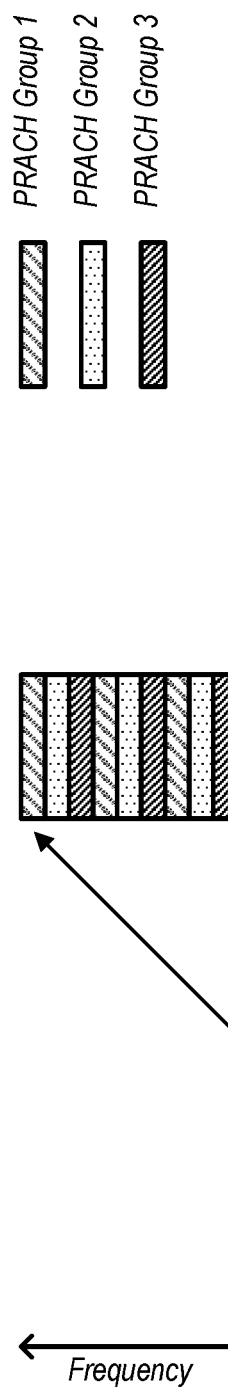

FIG. 10 illustrates that multiple users may be multiplexed within the multiple subcarriers using multiple groups. More specifically, instead of simply using code domain multiplexing (e.g., applicable to the licensed frequency range), frequency domain multiplexing (FDM) may be used. In this case, PRACH group 1 corresponds to the embodiments shown in FIG. 8; however, PRACH groups 2 and 3 have been added in the other available subcarriers. Thus, the different groups of PRACH resources may be frequency domain multiplexed. Moreover, within each group, PRACH resources can be further differentiated using CDM. For example, different sequences may be used according to CDM, e.g., cyclic shift of the same ZC sequence in frequency domain.

Increase Sub-Carrier Spacing

As another possibility, larger sub-carrier spacing may be used to increase the bandwidth and allow for higher power. In particular, the sub-carrier spacing may be increased by $2^u$ such that the PRACH sequence can occupy the whole channel or large enough bandwidth to achieve a high or maximum allowed transmit power. Further, because this increase in spacing reduces the length in the time domain, the preamble may be repeated K times, which may compensate the symbol duration reduction due to larger sub-carrier spacing. Note that mathematically, this embodiment has a similar effect as the one discussed above using M tone spacing.

This embodiment may allow for larger peak transmit power. Additionally, the effective bandwidth increase may be $2^u$, which equivalently allow the peak transmit power to increase by $2^u$ times. Further, the single carrier waveform property may be maintained.

The increase of the SCS may be configured by the network, e.g., with values of 2, 4, or 8, although others are envisioned. Additionally, the number of repetitions (K) may also be configured by the network.

Figure 11:
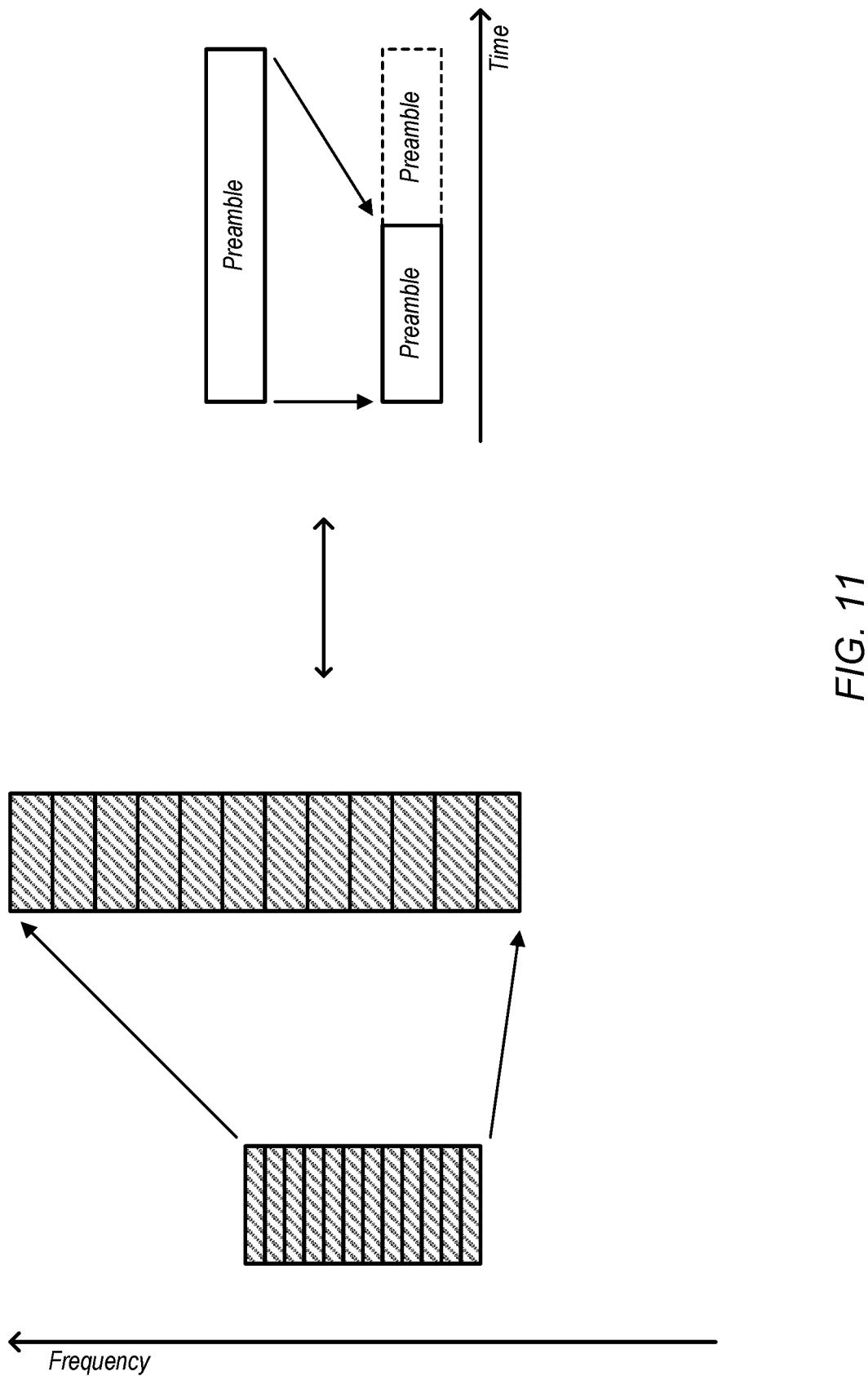
FIGS. 11 and 12 are exemplary illustrations of spreading preambles in the frequency domain by expanding sub-carrier spacing, according to some embodiments.

FIG. 11 illustrates an exemplary increase of sub-carrier spacing by 2, which may allow for an additional repetition of the preamble in the time domain.

Figure 12:
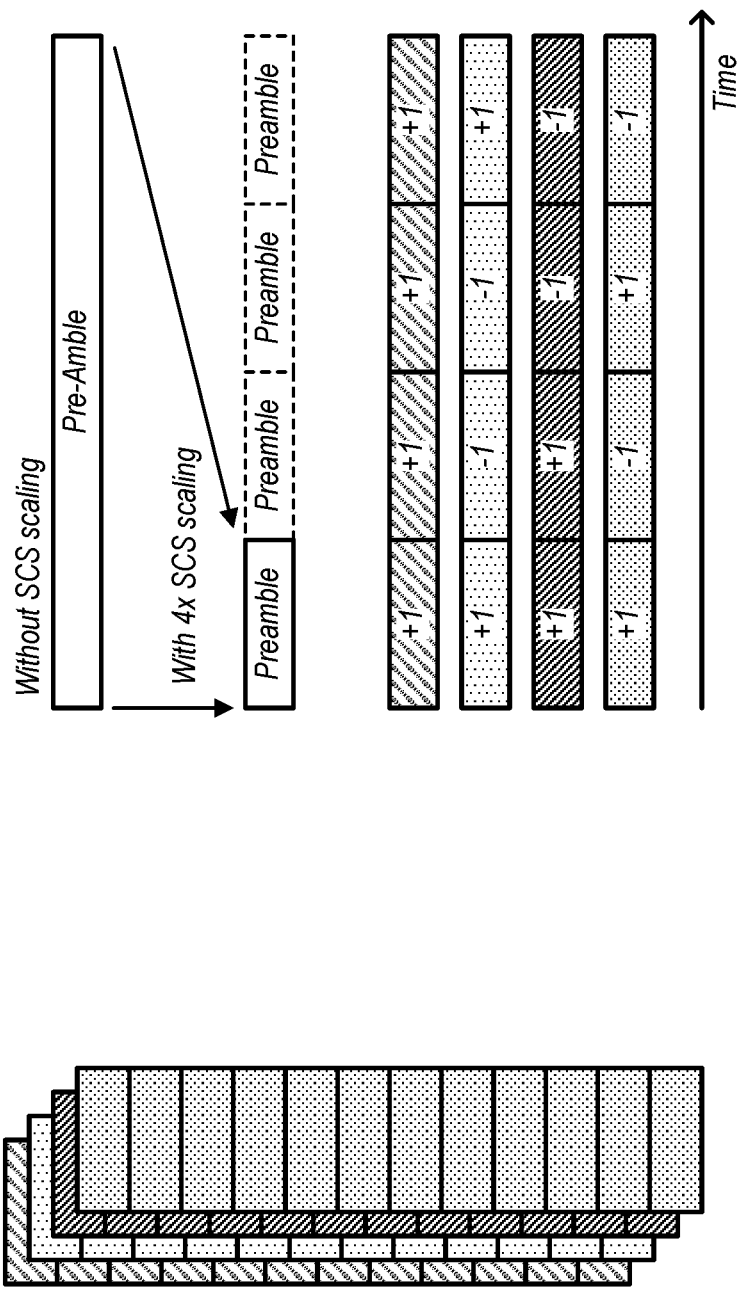

FIG. 12 illustrates how multiple users may be multiplexed using CDM. In particular, the preamble may be repeated in the time domain. Different groups of PRACH resources may be code domain multiplexed by applying time domain orthogonal cover codes per group, as shown. In particular, PRACH group 1 may use an OCC of (1, 1, 1, 1), PRACH group 2 may use (1, −1, −1, 1), PRACH group 3 may use (1, 1, −1, −1), and PRACH group 4 may use (1, −1, 1, −1). Other OCC codes and implementations are envisioned.

Moreover, within each group, PRACH resources may be differentiated with different sequences, e.g., cyclic shifts of the same ZC sequence in the frequency domain.

Figure 13:
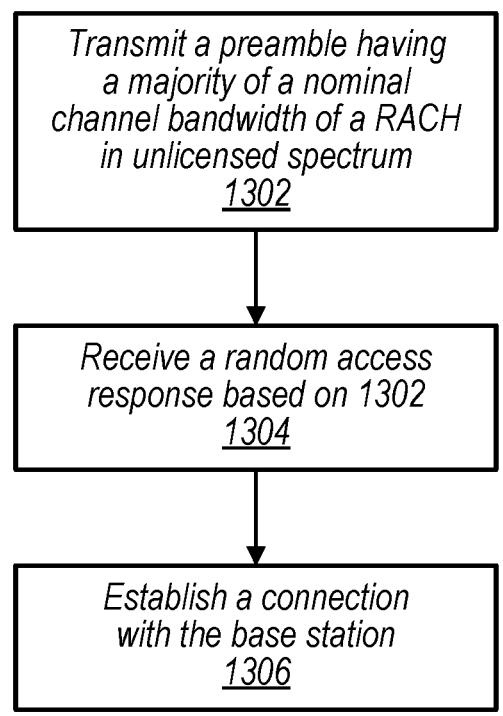
FIG. 13 is a flowchart diagram illustrating an exemplary method for using preambles for wireless communication, according to some embodiments.

FIG. 13—Transmitting a Preamble in Unlicensed Spectrum

FIG. 13 is a flowchart diagram illustrating a method for transmitting a preamble in unlicensed spectrum. Aspects of the method of FIG. 7 may be implemented by a wireless device, a base station, and/or a network, such as a UE 106, the BS 102, and/or the network 100 (e.g., a 5G AMF) illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

In 1302, a UE may transmit a preamble to a base station in a random access channel (RACH) (e.g., a physical RACH (PRACH)) as part of a random access procedure. The RACH may be located in unlicensed spectrum.

In some embodiments, the bandwidth of the preamble comprises a majority of a nominal channel bandwidth of the RACH, e.g., satisfying the requirements discussed above. For example, the bandwidth of the preamble may be between 80% and 100% of the nominal channel bandwidth of the RACH. Additionally, the preamble may be transmitted at substantially a maximum allowed transmit power based on the bandwidth of the preamble. For example, the preamble may be transmitted at near the maximum power, such as 23 dBm. The bandwidth of the preamble may be substantially larger than preambles transmitted in licensed spectrum. In other words, if the UE had transmitted the preamble according to normal configurations or parameters used in the licensed spectrum (e.g., NR), then the bandwidth of the preamble would have been substantially smaller or less than the bandwidth of 1202. Thus, the UE may be configured to transmit preambles to a base station in licensed spectrum (e.g., NR) at a first bandwidth and transmit preambles to a base station (a same or different base station) in unlicensed spectrum (e.g., NR-U) at a second bandwidth that is substantially larger than the first bandwidth.

As noted above, the preamble may have a wider bandwidth by transmitting the preamble with sub-carrier interlacing, e.g., but maintain the same sub-carrier spacing relative to licensed spectrum. For example, the preamble may be transmitted over a first plurality of subcarriers that are a strict subset of the subcarriers of the RACH, e.g., every M subcarriers of the RACH, where M is at least 2. In some embodiments, the RACH preambles may be interlaced with reference signals (e.g., SRS) in the frequency domain.

In one embodiment, UEs of a first RACH group may transmit preambles to the base station using the first plurality of subcarriers. However, UEs of a second RACH group may transmit preamble(s) to the base station using a second plurality of subcarriers that are different than the first plurality of subcarriers. The second plurality of subcarriers may also be a strict subset of the subcarriers of the RACH. The second plurality of subcarriers may also be every M subcarriers of the RACH (e.g., where the preamble(s) of the second RACH group may be sent using one out of every M subcarriers), where M is the same value for both RACH groups. Thus, the two RACH groups may be frequency domain multiplexed among the available sub-carriers used as RACH resources. As discussed above, within each RACH group, preambles of respective UEs may be code division multiplexed (e.g., by applying different cyclic shift of tones in the frequency domain). Thus, the base station may be configured to receive a plurality of preambles from different UEs (e.g., possibly having a plurality of preambles across multiple groups and a plurality of preambles within at least one of the groups) using the wider bandwidth discussed above (e.g., using sub-carrier interlacing). The base station may also be configured to receive narrower bandwidth preambles in the licensed spectrum, e.g., concurrently. The value of M may be selected/configured by the network. One example criterion of selecting M is to expand the PRACH OCB to satisfy the regulation requirement on OCB (e.g. occupy >80% of the NCB) as well as reaching enough transmission power under the PSD regulation (e.g. 10 dBm/ mHz).

Alternatively, as also described above, the preamble may have a wider bandwidth by transmitting the preamble with a larger or wider subcarrier spacing than the licensed spectrum (e.g., greater than 15 kHz). For example, the sub-carrier spacing may be increased by $2^u$ relative to the preambles transmitted in the licensed spectrum (e.g., where u may be 2, 4, 8, or other values as desired). Similar to above, preambles of other UEs may be code division multiplexed with the preamble of the UE, e.g., all using the same larger sub-carrier spacing. Thus, the base station may be configured to receive a plurality of preambles from different UEs (e.g., possibly having a plurality across multiple groups and a plurality within at least one of the groups) using the wider bandwidth discussed above (e.g., using a wider sub-carrier spacing than for licensed spectrum). As a result of the increased subcarrier spacing, the time duration of each PRACH preamble is also reduced accordingly (e.g. by $2^u$). This may impact the PRACH detection performance as the total transmitted energy is reduced due to the shorter duration. To compensate this time-reduction effect, the network can simultaneously configure the UE to transmit multiple copies of the PRACH preamble in time. The number of PRACH preamble repetition can be $2^u$ or any other integers configured by the network. Further, the network can apply time domain orthogonal cover codes (OCC) to the multiple copies of the PRACH Preamble repetitions as shown in FIG. 10. The application of the time domain OCC allows the network to multiplex several UEs over the same time/frequency resources. The base station may also be configured to receive narrower bandwidth preambles in the licensed spectrum, e.g., concurrently.

In some embodiments, e.g., due to the wider bandwidth of the preamble, the preamble may be transmitted a plurality of times to the base station. Note that this ability to transmit a plurality of times to the base station may be more than was possible using prior methods (e.g., only a single transmission may have been previously possible). For example, the repetition of the RACH preamble may be at a symbol-level, multiple-symbol-level, or segment-level (e.g. this segment could be 2 or 6 symbols). In some embodiments, the repetition factor could be similar order of the interlacing factor M. The overall RACH preamble (including repetition) length can be variable, targeting different cell sizes, and these parameters (including repetition factor) may be configured by the network (or BS) accordingly.

Note that the configuration of the preamble may be configured by the BS. For example, the BS may transmit configuration information that specifies the value of M, the value of u, and/or the number of repetitions of the preamble, among other parameters. In one embodiment, the UE may decode this information (e.g., from a broadcast channel, such as while decoding MIB or SIBs) prior to transmitting the preamble to the base station. The UE may then transmit the PRACH according to the parameters specified by the information.

In 1304, in response to transmitting the preamble, the UE may receive a random access response from the base station;

In 1306, in response to the random access response, the UE may establish a connection (e.g., an RRC connection) with the base station.

Additional Embodiments

The following embodiments may augment any of the described embodiments herein, but are not intended to limit their scope.

It has been identified that enhancement of one or more legacy PRACH formats is feasible for NR-U. Four potential design alternatives, including no interlacing, have been identified for the frequency mapping of PRACH sequences for NR-U:

Alt-1: Uniform PRB-level interlace mapping. In this embodiment, a PRACH sequence for a particular PRACH occasion may be mapped to all of the PRBs of one or more of the interlaces in the PRB-based block interlace structure. Within a PRB, either all or a subset of REs may be used. Different PRACH occasions may be defined using an orthogonal set of PRBs, or an orthogonal set of resource elements (REs) within the PRBs, from one or more same/different interlaces. It has been identified that a uniform mapping (equal spacing of PRBs) in the frequency domain may produce a zero-autocorrelation zone, of which the duration is inversely proportional to the frequency spacing between the PRBs.

Alt-2: Non-uniform PRB-level interlace mapping. In this embodiment, a PRACH sequence for a particular PRACH occasion may be mapped to some or all of the PRBs of one or more of the interlaces in the same PRB-based block interlace structure used for PUSCH/PUCCH. Within a PRB, either all or a subset of REs may be used. Different PRACH occasions may be defined using an orthogonal set of PRBs, or an orthogonal set of REs within the PRBs, from one or more same/different interlaces. It has been identified that an irregular mapping (non-equal spacing of PRBs/REs) in the frequency domain may reduce the false peaks in the PRACH preamble auto-correlation function.

Alt-3: Uniform RE-level interlace mapping. In this embodiment, a PRACH sequence for a particular PRACH occasion may implement of a "comb-like" mapping in the frequency domain, e.g., with equal spacing between all used REs. Different PRACH occasions may be defined by way of different comb offsets. In some embodiments, since this approach does not fit with the common PUSCH/PUCCH interlace structure, only TDM multiplexing of PUSCH/PUCCH and PRACH may be supported. Alternatively, puncturing/rate matching PUSCH/PUCCH around the used PRACH REs may be used.

Alt-4: Non-interlaced mapping. In this embodiment, a PRACH sequence for a particular PRACH occasion is mapped to a number of contiguous PRBs, e.g., same or similar to NR Rel-15. To fulfil the minimum OCB requirement, the PRACH sequence may be mapped to a set of contiguous PRBs, and the PRACH sequence mapping may be repeated across the frequency domain, potentially with guard RE(s)/PRB(s) between repetitions. For each repetition, a different cyclic shift or different base sequence may or may not be applied.

Exemplary Embodiments

The following paragraphs describe exemplary embodiments.

In one embodiment, a method comprises: by a UE: transmitting a preamble to a base station in a random access channel (RACH), wherein the RACH is located in unlicensed spectrum, wherein bandwidth of the preamble comprises a majority of a nominal channel bandwidth of the RACH; receiving a random access response; and establishing a connection with the base station in response to receiving the random access response.

In one embodiment, the bandwidth of the preamble comprises between 80% and 100% of the nominal channel bandwidth of the RACH.

In one embodiment, wherein the preamble is transmitted substantially at a maximum allowed transmit power based on the bandwidth of the preamble.

In one embodiment, wherein the bandwidth of the preamble is substantially larger than preambles transmitted in licensed spectrum.

In one embodiment, the preamble is transmitted with subcarrier interlacing.

In one embodiment, the preamble is transmitted every M subcarriers of the RACH, wherein M is at least 2.

In one embodiment, the method further comprises: receiving configuration information from the BS prior to transmitting the preamble, wherein the configuration information specifies the value of M.

In one embodiment, the preamble is transmitted over a first plurality of subcarriers, wherein the UE is located in a first RACH group, wherein other UEs of a different RACH group transmit preambles over a second plurality of subcarriers that are different from the first plurality of subcarriers, wherein the second plurality of subcarriers are also every M subcarriers.

In one embodiment, a second UE is configured to transmit a second preamble using the same M subcarriers of the RACH, wherein the UE and the second UE transmit the preamble and the second preamble in a code division multiplexed manner.

In one embodiment, the preamble is transmitted with a same subcarrier spacing as preambles transmitted in licensed spectrum.

In one embodiment, the preamble is transmitted with a larger subcarrier spacing than preambles transmitted in licensed spectrum.

In one embodiment, the sub-carrier spacing is increased by 2ΛΔu relative to the preambles transmitted in the licensed spectrum.

In one embodiment, the method further comprises: transmitting the preamble a plurality of times.

In one embodiment, the preamble is code division multiplexed with preambles of other UEs using the same larger sub-carrier spacing, wherein the code division multiplexing is achieved by applying time domain orthogonal cover codes over the plurality of preamble repetitions.

In one embodiment, a device comprises: an antenna; a radio coupled to the antenna; and a processing element coupled to the radio; wherein the device is configured to implement any method described herein.

In one embodiment, a memory medium comprises program instructions that, when executed, cause a device to implement any method described herein.

In one embodiment, an apparatus, comprises: a memory; and at least one processor in communication with the memory; wherein the at least one processor is configured to implement any method described herein.

In one embodiment, a method includes any action or combination of actions as substantially described herein in the Detailed Description and claims.

In one embodiment, a method is disclosed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In one embodiment, a wireless device is disclosed that is configured to perform any action or combination of actions as substantially described herein in the Detailed Description, Figures, and/or claims.

In one embodiment, a wireless device is disclosed that includes any component or combination of components as described herein in the Detailed Description and/or Figures as included in a wireless device.

In one embodiment, a non-volatile computer-readable medium is disclosed that stores instructions that, when executed, cause the performance of any action or combination of actions as substantially described herein in the Detailed Description and/or Figures.

In one embodiment, an integrated circuit is disclosed that is configured to perform any action or combination of actions as substantially described herein in the Detailed Description and/or Figures.

In one embodiment, a mobile station is disclosed that is configured to perform any action or combination of actions as substantially described herein in the Detailed Description and/or Figures.

In one embodiment, a mobile station is disclosed that includes any component or combination of components as described herein in the Detailed Description and/or Figures as included in a mobile station.

In one embodiment, a mobile device is disclosed configured to perform any action or combination of actions as substantially described herein in the Detailed Description and/or Figures.

In one embodiment, a mobile device is disclosed that includes any component or combination of components as described herein in the Detailed Description and/or Figures as included in a mobile device.

In one embodiment, a network node is disclosed that is configured to perform any action or combination of actions as substantially described herein in the Detailed Description and/or Figures.

In one embodiment, a network node is disclosed that includes any component or combination of components as described herein in the Detailed Description and/or Figures as included in a mobile device.

In one embodiment, a base station is disclosed that is configured to perform any action or combination of actions as substantially described herein in the Detailed Description and/or Figures.

In one embodiment, a base station is disclosed that includes any component or combination of components as described herein in the Detailed Description and/or Figures as included in a mobile device.

In one embodiment, a 5G NR network node or base station is disclosed that is configured to perform any action or combination of actions as substantially described herein in the Detailed Description and/or Figures.

In one embodiment, a 5G NR network node or base station is disclosed that includes any component or combination of components as described herein in the Detailed Description and/or Figures as included in a mobile device.

Note that while various embodiments described herein may relate to 5G/NR, they may be extended to any set of wireless communication, including LTE, GSM, CDMA, etc.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
one or more processors, wherein the one or more processors are configured to cause a wireless device to:
transmit a preamble to a base station in a random access channel (RACH) a plurality of times in the time domain, wherein the RACH is comprised in unlicensed spectrum, wherein bandwidth of the preamble comprises a 80 percent to 100 percent of a nominal channel bandwidth of the RACH, wherein the preamble is code division multiplexed with preambles of other wireless devices using a larger sub-carrier spacing than preambles transmitted in licensed spectrum, wherein the code division multiplexing is achieved by applying time domain orthogonal cover codes over the plurality of preamble repetitions in the time domain;
receive a random access response; and
establish a connection with the base station in response to receiving the random access response.

2. The apparatus of claim 1,
wherein the preamble is transmitted every M subcarriers of the RACH, wherein M is at least 2.

3. The apparatus of claim 2,
wherein the one or more processors are further configured to cause the wireless device to:

receive configuration information from the base station prior to transmitting the preamble, wherein the configuration information specifies a value of M.

4. The apparatus of claim 2,
wherein the preamble is transmitted over a first plurality of subcarriers, wherein the apparatus is included in a first RACH group, wherein other wireless devices of a different RACH group transmit preambles over a second plurality of subcarriers that are different from the first plurality of subcarriers, wherein the second plurality of subcarriers are also every M sub carriers.

5. The apparatus of claim 4,
wherein a second wireless device is configured to transmit a second preamble using the same M subcarriers of the RACH, wherein the apparatus and the second wireless device transmit the preamble and the second preamble in a code division multiplexed manner.

6. The apparatus of claim 2,
wherein the preamble is transmitted with a same subcarrier spacing as preambles transmitted in licensed spectrum.

7. The apparatus of claim 2,
wherein the preamble is interlaced in the frequency domain with reference signals.

8. A wireless device, comprising:
an antenna;
a radio coupled to the antenna; and
a processing element coupled to the radio;
wherein the processing element is configured to cause the wireless device to:
transmit a preamble to a base station in a random access channel (RACH) a plurality of times in the time domain, wherein the RACH is located in unlicensed spectrum, wherein bandwidth of the preamble comprises a 80 percent to 100 percent of a nominal channel bandwidth of the RACH, wherein the preamble is code division multiplexed with preambles of other wireless devices using a larger sub-carrier spacing than preambles transmitted in licensed spectrum, wherein the code division multiplexing is achieved by applying time domain orthogonal cover codes over the plurality of preamble repetitions in the time domain;
receive a random access response; and
establish a connection with the base station in response to receiving the random access response.

9. The wireless device of claim 8, wherein the preamble is transmitted every M subcarriers of the RACH, wherein M is at least 2.

10. The wireless of claim 9, wherein the processing element are further configured to cause the wireless device to:
receive configuration information from the BS prior to transmitting the preamble, wherein the configuration information specifies a value of M.

11. The wireless device of claim 9, wherein the processing element is further configured to cause the wireless device to:
transmit a second preamble to the base station in a second RACH located in licensed spectrum, wherein the preamble is transmitted with a same subcarrier spacing as the second preamble.

12. The wireless device of claim 9, wherein the processing element is further configured to cause the wireless device to:
transmit a second preamble to the base station in a second RACH comprised in licensed spectrum, wherein the preamble is transmitted with a larger subcarrier spacing than the second preamble.

13. The wireless device of claim 9,
wherein the preamble is transmitted with a same subcarrier spacing as preambles transmitted in licensed spectrum.

14. The wireless device of claim 9,
wherein the preamble is interlaced in the frequency domain with reference signals.

15. A method, comprising:
by a user equipment device (UE):
transmit a preamble to a base station in a random access channel (RACH) a plurality of times in the time domain, wherein the RACH is located in unlicensed spectrum, wherein bandwidth of the preamble comprises a 80 percent to 100 percent of a nominal channel bandwidth of the RACH, wherein the preamble is code division multiplexed with preambles of other wireless devices using a larger sub-carrier spacing than preambles transmitted in licensed spectrum, wherein the code division multiplexing is achieved by applying time domain orthogonal cover codes over the plurality of preamble repetitions in the time domain;
receiving a random access response; and
establishing a connection with the base station in response to receiving the random access response.

16. The method of claim 15, wherein the preamble is transmitted every M subcarriers of the RACH, wherein M is at least 2.

17. The method of claim 16,
wherein the preamble is interlaced in the frequency domain with reference signals.

18. The method of claim 15, wherein the preamble is transmitted with a same subcarrier spacing as preambles transmitted in licensed spectrum.

19. The method of claim 15, wherein the preamble is transmitted with a larger subcarrier spacing than preambles transmitted in licensed spectrum.

20. The method of claim 19, wherein the sub-carrier spacing is increased by $2^u$ relative to the preambles transmitted in the licensed spectrum.

* * * * *